United States Patent [19]
Kunze et al.

[11] Patent Number: 5,596,805
[45] Date of Patent: Jan. 28, 1997

[54] METHOD OF MANUFACTURING A PLAIN BEARING FOR A MOVABLE FUNCTIONAL PART OF SYNTHETIC RESIN MATERIAL, WHILE RETAINING AN UNPERTURBED MOLECULAR STRUCTURE

[75] Inventors: Norbert Kunze, Ehringshausen; Georg Weber, Lohra-Weipoltshausen; Wolfgang Fallenbeck, Herborn-Hörbach; Helmut Käufer, Mettmann; Georg Kämmler, Berlin, all of Germany

[73] Assignee: U.S. Philips Corporation, New York, N.Y.

[21] Appl. No.: 442,076

[22] Filed: May 16, 1995

Related U.S. Application Data

[63] Continuation of Ser. No. 939,272, Sep. 2, 1992, abandoned.

[30] Foreign Application Priority Data

Sep. 5, 1991 [DE] Germany .......................... 41 29 468.8

[51] Int. Cl.⁶ .................................................... F16C 33/20
[52] U.S. Cl. ................. 29/898.055; 29/434; 29/898.056; 29/898.07; 264/242; 264/249; 264/273
[58] Field of Search ........................ 29/434, 892, 892.1, 29/892.11, 893.2, 898.055, 898.056, 898.057, 898.07; 264/242, 249, 273, 310, 328.1, 328.14

[56] References Cited

U.S. PATENT DOCUMENTS

| 2,705,346 | 4/1955 | Schlabach et al. |
| 3,214,504 | 10/1965 | Gemberling ............................ 264/242 |
| 3,570,120 | 3/1971 | Adams et al. ................... 29/898.055 X |
| 4,158,450 | 6/1979 | Suzuki ................................ 264/242 X |
| 4,502,034 | 2/1985 | Endo et al. ....................... 264/242 X |
| 4,707,320 | 11/1987 | Sherman, II ......................... 29/434 X |

FOREIGN PATENT DOCUMENTS

| 0392600 | 4/1990 | European Pat. Off. . |
| 938113 | 9/1948 | France .................................... 264/242 |
| 1472403 | 9/1971 | Germany . |
| 2627346 | 12/1977 | Germany ............................... 264/242 |
| 2841937 | 4/1980 | Germany . |
| 3246626 | 6/1984 | Germany ............................. 29/898.07 |
| 599157 | 3/1948 | United Kingdom .............. 29/898.055 |
| 926004 | 5/1963 | United Kingdom .............. 29/898.055 |

Primary Examiner—S. Thomas Hughes
Attorney, Agent, or Firm—Brian J. Wieghaus

[57] ABSTRACT

A method of manufacturing a functional part of synthetic resin material in a bearing plate so as to have good bearing properties. The functional part is formed at a bearing plate by a synthetic-resin injection-molding technique (outsert molding technique) with a bridge portion extending through a hole having hole walls of the bearing plate and with integral retaining portions disposed at both plate surfaces laterally of the hole. The functional part consisting of the bridge portion and the retaining pieces is then changed by a deformation process following the injection-molding operation so that it forms a rotation or slide bearing together with the bearing plate. In the deformation process, the synthetic resin material is pressed away by a mandrel acting on an internal wall of a bore in the bridge portion to cause the synthetic material to flow towards the hole wall of the bearing plate and longitudinally towards the plate surfaces. A load-resistant, partial molecular re-orientation is obtained, which may be rendered heat-resistant after the deformation through fixation and possibly by storing.

31 Claims, 8 Drawing Sheets

METHOD OF MANUFACTURING A PLAIN BEARING FOR A MOVABLE FUNCTIONAL PART OF SYNTHETIC RESIN MATERIAL, WHILE RETAINING AN UNPERTURBED MOLECULAR STRUCTURE

This is a continuation of application Ser. No. 07/939,272, filed Sep. 2, 1992, now abandoned.

BACKGROUND OF THE INVENTION

The invention relates to a method of manufacturing a plain bearing for a movable functional part which is formed integrally with its bearing part at a metal bearing plate by a synthetic-resin injection moulding technique, such as the outsert moulding technique. More particularly, the invention relates to functional parts which are formed by this technique with a bearing bridge extending through a hole of the metal bearing plate, which hole has hole walls, and bears on both plate surfaces laterally of the hole with retaining pieces, after which the bearing part comprising the bearing bridge and the retaining pieces is changed by a deformation process following the injection moulding process in such a manner that it forms a rotation or slide bearing together with the bearing plate. The invention also relates to a device for carrying out this method, and to a bearing part of the plain bearing of the movable functional part. The plain bearing is provided in particular for forming rotational or slidable parts with plain bearing quality on metal plates in running gears of tape reproduction devices, the parts being moulded at the metal plates by the outsert moulding technique.

Such a method of manufacturing a bearing of a movable functional part is known from EP 392 600 A2. The bearing plate in that case is a base plate which is provided with a plurality of retaining, supporting and functional parts, the parts provided by injection or moulding each gripping the plate by means of a bridge extending through a plate hole and retaining pieces provided on either side of the plate surfaces. Such parts are either fixed or have a limited rotation capability; they exhibit no bearing properties.

EP 392 600 A2 describes that the movable bearing part comprising the bridge and the retaining pieces provided on either side of the plate surfaces can be so changed by a subsequent deformation operation that the bearing is made into a plain bearing. Slides, wheel bearings for slides and gearwheels, for example, can be formed in this manner directly at the metal plate.

Reference is made in this connection to U.S. Pat. No. 3,214,504, which discloses how synthetic-resin injection-moulded spindle ends are made capable of rotation by a flexing operation in the manufacture of a spindle for a fishing rod.

DE-AS 14 72 403 discloses a method of manufacturing a mitre gear drive from synthetic-resin gears according to which the mitre gear bearings are formed in that the gear spindles are injected through a hole in a retaining plate and a wide overlap of the spindle hole, through which injection took place, is effected at the mitre gear side, while the overlap at the other side of the retaining plate is only small. The mitre gear wheels are brought into mutual engagement in that the retaining plate is crimped over. The crimping operation at the same time achieves a locking of the mitre gear wheels against dropping out. It is not described in what manner the injected parts obtain bearing properties.

SUMMARY OF THE INVENTION

It is an object of the invention to cause the deformation process to run in such a controlled manner that the synthetic resin is not adversely affected as to its structure during a deformation process and the external geometry above and below the bearing plate is not changed.

According to the invention, this object is achieved in that the bridge material is deformed by being pressed away from its central bridge region, the deformation process being carried out under time and temperature conditions under which the synthetic resin is capable of flow in accordance with its properties while retaining its unperturbed molecular structure.

This process is a deformation process involving a change in the molecular alignment of the resin material without a change in its chemical composition. Preferred molecular orientations are created thereby at the loaded and sliding locations which lead to a better sliding quality and a higher bearing capacity. The orientation is load-resistant.

Through the use of those parameters of the synthetic resin at which it is particularly capable of flow, the envisaged flow is promoted and the structure of the synthetic resin is maintained in spite of a locally limited change in shape. In addition, a return to the original shape can be avoided through the use of the flow capability of the synthetic resin.

According to a further embodiment of the invention, it is ensured that the bridge material is deformed by being pressed away towards the hole walls, or in that the bridge material is deformed through stretching of the bearing bridge in its longitudinal direction. In either case, the retaining pieces will be lifted off the plate surfaces.

According to a further embodiment of the invention, it is ensured that the synthetic resin is displaced away from the central bridge region by means of mandrels which are introduced into the hole from one of the, or from both, bearing plate surfaces. The flaring mandrels accordingly press away the synthetic resin in a displacement process towards the hole walls. According to a further embodiment of the invention, it is in that case ensured that the synthetic resin during the displacement towards the hole walls flows towards these walls and is partly diverted towards the plate surfaces.

To guarantee a sufficient flow capability of the synthetic resin it is important that the displacement process should not take place too fast, so as to afford the synthetic resin time to flow. According to a further embodiment of the invention it is for this purpose ensured that the displacement velocity lies below 0.1 m/sec. Higher velocities are also possible when PP (polypropylene) and HDPE (polythene) are used.

The flow capability of the synthetic resin and its flow velocity also depend directly on the temperature of the synthetic resin during the displacement process. According to a further embodiment of the invention, it has proved particularly effective if the temperature of the synthetic resin is set above the operating temperature and below the melting range or softening range during the displacement process.

According to a further embodiment of the invention, the molecular orientation created during the treatment is stabilized by a fixation, i.e. cooling down while the deformation pressure is maintained, and by tempering, i.e. storage at a certain temperature without load. This stabilization also remains in the case of subsequent renewed heat treatments. The necessary flow of the synthetic resin can already be achieved by a thermofixation during 10 minutes.

The moment of the deformation may be chosen so as to suit the circumstances, i.e. with the product still in the injection-moulding tool, immediately after removal from the mould, after renewed heating, or after removal from the mould and after cooling down of the workpiece.

Certain devices are suitable for carrying out the method according to the invention, of which a first device is characterized by a lightly tapering mandrel which can be passed through an opening in the central bridge region for partly displacing the synthetic resin material present between the mandrel and the hole walls. Such a lightly tapering mandrel, whose taper according to a further embodiment of the invention is 3° to 7° relative to the mandrel centreline, displaces the synthetic resin material between itself and the hole walls and further towards the plate surfaces while partly aligning the molecular structure.

A second advantageous embodiment of the device for carrying out the method is characterized by mandrels which can be moved from both plate surfaces against the opening in the central bridge region for displacing the synthetic resin material present between the mandrels and the hole walls. Such a two-sided mandrel application improves the linear displacement effect of the mandrel(s) relative to the hole walls.

A further evening-out of the displacement directed towards the hole walls can be achieved with the use of mandrels introduced into openings of the bridge in a third embodiment of the device characterized by a slotted bush which is provided between the wall of the opening and the hole walls in the case of a round opening during the widening and displacement process, whereby the mandrels press with tapering mandrel tips against the bush with widening effect. According to a further modification of this embodiment, it is provided that the wall of the opening has a bulging shape towards the centre with a smaller passage diameter. In the case of a radial bearing design, the bush widens radially and optimizes the radial displacement effect in the direction of the hole walls as well as the lengthening of the bearing bridge.

A fourth embodiment of the device for carrying out the method according to the invention is characterized in that the opening in the bearing bridge can be widened through free-forming by means of at least one eccentrically arranged mandrel by an eccentric motion of the mandrel whereby the synthetic resin material present between the mandrel and the hole walls is partly displaced. The mandrel moving eccentrically about the central opening axis widens the opening in a kind of flexing movement.

A fifth embodiment of the device for carrying out the method according to the invention is characterized in that the opening in the bearing bridge has an elliptical cross-sectional profile, in that the mandrel(s) has (have) a correspondingly shaped elliptical profile, and in that the material of the bearing bridge can be widened away by free-forming through a rotating or reciprocating movement of the mandrel(s) between mandrel and hole walls by the partial displacement of the synthetic resin material. With the elliptical profile of the opening and the elliptical cross-section of the mandrel, a similar widening effect is obtained as in the fourth embodiment, again approximating a flexing process, which alternately loads and relieves the synthetic resin material between the opening and the hole walls.

According to an advantageous modification of the fourth and fifth embodiment, it is provided that the mandrel has a bulging shape whose major diameter is situated approximately in the centre of the bearing bridge or in the central region of the bearing plate. The lengthening effect on the bearing bridge is improved by this.

A sixth embodiment of the device for carrying out the method according to the invention is characterized in that an insert mandrel is already introduced into the central region of the bearing bridge during the manufacture of the bearing part by the injection-moulding technology, which mandrel has a constriction at least in the hole region, and in that the bearing bridge is widened through pulling-out of the insert mandrel, so that the opening initially filled by the insert mandrel is widened by a partial displacement of the synthetic resin material. The subsequent provision of a mandrel is redundant in this case because the mandrel carrying out the widening operation is surrounded with synthetic resin in the opening during the injection-moulding process itself and causes the widening of the opening when being pulled out. This represents a considerable simplification of the equipment.

According to a seventh embodiment of the invention, it is arranged that a mandrel can be introduced into an opening of the bearing bridge which extends only from one of the plate surfaces into the bearing bridge in such a manner that a support disc occupying the complete cross-sectional area of the bearing bridge is formed in the region of the other plate surface, with which mandrel the bearing bridge can be stretched in longitudinal direction. Loosening of the retaining pieces in this case is achieved through lengthening of the bridge only. In addition, a greater clearance between the hole walls and the bearing bridge can be set during this lengthening process.

It is particularly favourable when in this seventh embodiment the bottom of the opening is provided approximately at the level of the second plate surface reached by the mandrel upon its insertion. The bearing bridge is stretched over its entire length in this manner.

An eighth embodiment of the invention is so arranged that a mandrel can be moved against the opening in the bearing part, which mandrel in the direction towards its free end shows a transition from a portion of greater diameter than the opening via a constricted portion into a portion of smaller diameter, and that the portion of smaller diameter can be introduced into a recess of a hold-down by means of which the bearing part can be supported against the application direction of the mandrel for the displacement of the synthetic resin material in the direction of the hole walls. As a result, the mandrel cannot slip away sideways and carries out a very even displacement in the direction of the hole walls.

A further modification of the eighth embodiment of the invention is characterized in that the inner diameter of the hold-down and the outer diameter of the mandrel portion of smaller diameter are so attuned to one another that the mandrel portion is guided in the hold-down during the deformation process.

The formation of the openings in the bearing bridges is also of essential importance for the displacement, stretching, and widening effect as well as for the orientation or internal reinforcement effect.

According to a further embodiment of the invention, a bearing part of the plain bearing formed from synthetic resin together with the functional part and comprising a bearing bridge, —which extends through the hole in the metal plate, and —which together with the hole walls, the plate surface regions surrounding the hole walls and the retaining pieces form the movable bearing part, has the characteristic that the bearing bridge comprises the opening with the opening wall in its central portion and in passage direction, and that the opening has a wall shape which bulges towards the opening centre with a small opening diameter before the mandrels are inserted. This bulging wall shape towards the opening centre may be formed in various ways. A preferred modification is characterized in that the wall bulge has its smallest opening diameter approximately at half the opening length. Another preferred modification is characterized in that the wall bulge towards the opening centre is achieved through the formation of saddle surfaces. Given the corresponding mandrel shape, favourable conditions for the widening are then obtained, whereby the synthetic resin material flows from the opening centre towards the hole edge.

Another embodiment of the bearing part of the plain bearing is characterized in that the bearing bridge comprises the opening with the opening wall in its central portion and in passage direction and in that the opening has a wall which runs parallel to the hole walls before the mandrels are inserted. This opening may, for example, be widened by means of the eccentric mandrel or, in a further embodiment of the invention, is characterized in that a bush slotted transversely to the bearing plate is injection-moulded into the opening, which bush separates itself from the hole walls after widening of the bush. The bush drops from the opening after the widening process.

In another embodiment of the bearing part of the plain bearing, which is formed from synthetic resin together with the functional part and comprises a bearing bridge, —which extends through the hole of the metal plate, and —which together with the hole walls, the plate surface regions surrounding the hole edges and the retaining pieces forms the bearing part of the functional part, it is provided that the bearing bridge in the passage direction of the hole is partly provided with the opening in such a manner that a support disc is formed which occupies the complete cross-sectional area of the bearing bridge.

In a further development of this embodiment of the bearing part, it is possible to provide the opening and support disc construction in such a manner that the opening is subdivided into two opening portions which enter the hole from both plate surfaces, or in that the opening enters into one plate surface up to approximately the level of the other plate surface.

According to a further embodiment of the invention, it is provided that at least the portions of the bearing part subjected to the deformation are made of:

PM (polyoxymethylene/polyacetal);

ABS (acrylonitril-butadiene-styrene (copolymer));

PA (polyamide);

HDPE (polythene);

PP (polypropylene); or other thermoplastic materials. A further embodiment of the bearing part is then characterized in that the synthetic resins are reinforced with fibres, such as glass or carbon fibres; while it may also be characterized in that the synthetic resins are provided with fillers.

BRIEF DESCRIPTION OF THE DRAWINGS

The method according to the invention together with devices for carrying out this method according to the invention is described in more detail with reference to the drawings, in which:

FIGS. 2a and 2b show the deformation of a moulded plain bearing, formed by injection at the metal bearing plate, by means of two mandrels which are axially introduced into the bridge of the plain bearing from opposite directions, a radial support disc being maintained between the walls of a hole in the metal bearing plate through which the bridge is passed.

FIGS. 3a and 3b show the deformation of the injection-moulded bearing part of the functional part by means of two mandrels acting in opposite directions which radially widen a bush inserted into the opening of the bridge according to FIG. 1, FIG. 3a showing the widening process and FIG. 3b the result of the widening process; FIG. 3a-1 showing an optionally applicable, diagonally slotted bush;

FIGS. 4a to 4c show the widening of the bridge according to FIG. 1 by means of an eccentrically arranged mandrel, FIG. 4a showing the widening process in cross-section and FIG. 4b in plan view, while

FIGS. 5a to 5c show a modification of the embodiment of FIG. 4 in which the opening in the bridge is injection-moulded with an elliptical cross-section, and a mandrel which is elliptical in cross-section is introduced into this elliptical opening, which mandrel presses away the bridge in the elliptical opening through rotation, thus displacing the synthetic resin material; FIG. 5a showing the elliptical modification in cross-section and FIG. 5b partly in plan view with the mandrel cut away; while

FIGS. 8a and 8b show the conversion of an unfinished plain bearing with an opening for a mandrel, where the widening of the bridge is carried out between the mandrel and a fixed countersupport.

DESCRIPTION OF THE PREFERRED EMBODIMENTS

The outsert moulding technique, a synthetic resin injection or moulding technique, is used for forming functional parts such as gears, slides, adjustment levers, and other items at a metal bearing plate. Each bearing then consists of a hole or slot in the metal bearing plate and injection-moulded bearing parts which comprise a bearing bridge passed through the hole and retaining pieces gripping around the hole edges at the plate surfaces. The bearing parts carry functional parts such as gears, slides, levers, etc, for example, a running gear for magnetic tape devices. Such an injection-moulded part at the hole of the bearing plate is difficult to move since, as a result of contraction, the bridge has indeed become detached from the hole edges, but the retaining pieces lie tightly against the plate surfaces. This unfinished bearing must therefore be changed in order to be converted into a plain bearing. The properties of the synthetic resin are to be taken into account in this change so that its semi-crystalline structure remains intact and the plain bearing capability is not lost again owing to undesirable subsequent regeneration.

The transformation of the moulded bearing part into the movable parts of a plain bearing with plain bearing properties which remain constant throughout life is achieved by means of a deformation process in which the synthetic resin bridge is so changed in the hole of the bearing plate, more in particular is lengthened, that the retaining pieces are lifted off the plate surfaces while the contraction clearance between the bearing bridge and the hole walls remains substantially intact. The essence of the process for forming the sliding properties of the movable bearing part of the plain bearing consists in that the bridge material is deformed from its central bridge portion by pressure towards the hole walls, the deformation process taking place under time and temperature conditions under which the synthetic resin is particularly capable of flow in accordance with its properties, while a locally restricted alignment of its undisturbed molecular structure takes place. The deformation process must not proceed too quickly so that the synthetic resin has an opportunity to escape sideways under the exerted pressure. Any shearing action should be avoided. The temperature of the synthetic resin at the moment of deformation of the bridge has a clear influence on its flow capability during this. It has been found that a preferred displacement velocity of the resin material lies below 0.1 m/sec when the temperature of the synthetic resin material is set above the operating temperature and below the melting range during the displacement process.

During the displacement and stretching of the synthetic resin, it should be ensured that the bearing bridge is widened in the direction of the opposing walls of the hole. The synthetic resin material then shows a preferential flow towards the hole walls. The simplest possibility for displacement towards the hole walls consists in that a through opening or recesses are provided from the outside in the bridge itself in its central region, into which opening or recesses a mandrel is introduced from one side or two mandrels are introduced from two sides. Various preferred embodiments of the device according to the invention are available for this, which will be explained in more detail below. Another displacement and stretching possibility is that the bearing bridge is lengthened in its longitudinal direction.

Since the space between the mandrel(s) and the hole walls becomes smaller all the time during the displacement towards the hole walls, the synthetic resin must also escape in the longitudinal direction of the bearing bridge. This escape in longitudinal direction of the bearing bridge leads to a lengthening of the bridge and to a lifting effect of the retaining pieces away from the plate surfaces, while the contraction clearance between the bearing bridge and the hole walls is maintained. A complete functional plain bearing is thus created from the bearing part formed by injection-moulding at the bearing plate through deformation and fixation, the bearing properties of which do not deteriorate any more because no regeneration takes place, while the material is not prone to premature ageing because a change in the chemical structure has not taken place.

Figure 1A:
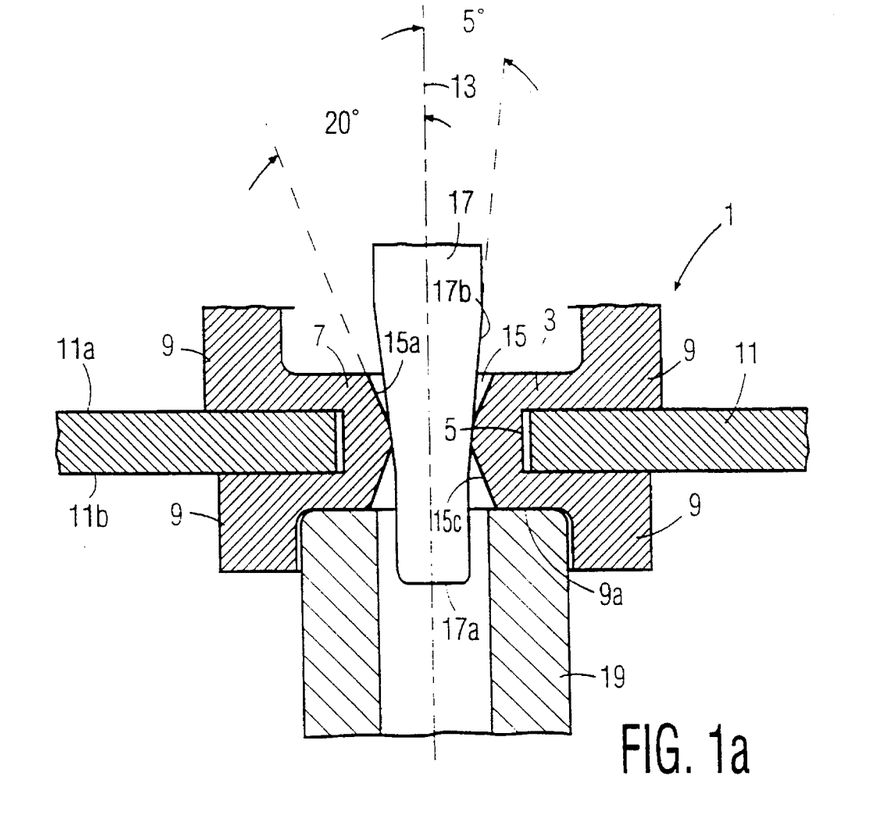
FIGS. 1a and 1b show the manufacture of a plain bearing, for example for a functional part, which after being injection moulded to a metal bearing plate of a running gear for magnetic tape devices is given its plain bearing property, the generation of the plain bearing property being effected by means of a tapering mandrel which is passed through an opening in the central region of a synthetic resin bridge of the movable plain bearing part extending through the bearing plate.

FIG. 1a shows a first embodiment of a device for widening the bearing bridge from the center towards the hole edges of the bearing plate. The unfinished bearing 1 which is to be given sliding capability then consists of a hole 3 in the fixed bearing plate 11 with hole edges 5, and a movable bearing part which has been injection-moulded around the hole 3 and which comprises a bearing bridge 7 and retaining pieces 9. The bridge 7 extends through the hole 3 and interconnects the retaining pieces 9 which rest on the plate surfaces 11a, 11b around the hole edges 5. Because of the contraction of the synthetic resin material of the bearing parts 7, 9, the bridge 7 has become detached from the hole edges 5, while the retaining pieces 9 clearly bear on the plate surfaces 11a, 11b. An opening 15 is provided in the central region of the bridge 7 along a centreline 13 (in the case of a slide) and an axis 13 (in the case of a rotary bearing). This opening 15 has a double-cone wall shape, the smallest opening diameter with the accompanying bulge being situated approximately at half the opening length. The opening 15 accordingly is usually constricted in the centre of the bridge 7, and widens to the greatest extent at the extreme ends of the bridge 7. The divergence between the centreline or axis 13 and the conical opening walls 15a may be approximately 20°.

A mandrel 17 with a tapering front 17a is used for widening the opening 15. The taper of the wall surface 17b relative to the centreline or axis 13 is approximately 5°. While the mandrel 17 is being pressed into the opening 15, the bearing part 1 is supported from the other end by means of a countersupport 19 which bears on a contact surface 9a of the retaining piece 9 shown in bottom position in the drawing.

When the mandrel 17 is slowly introduced into the opening 15, the synthetic resin material of the bridge 7 is displaced towards the hole edge 5, so that the synthetic resin flows towards the hole edge 5 and escapes from there along the centerline or axis 13 towards the plate surfaces 11a and 11b. The insertion velocity of the mandrel 17 is determined by the flow capability of the synthetic resin.

Figure 1B:
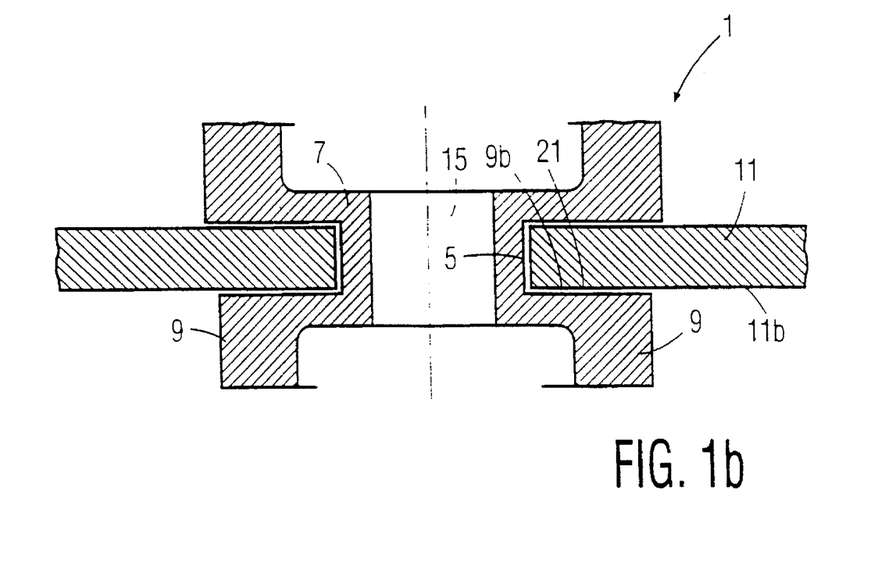

FIG. 1b shows how the bearing part 1 has changed after the introduction of the mandrel 17. The opening 15 now has straighter walls and the bridge has been so lengthened that a gap 21 has been created between the plate surface 11b and the retaining piece surface 9b previously bearing thereon. Since the bridge 7 again has a certain radial clearance relative to the hole wall 5 owing to elastic regeneration after the deformation, a plain bearing with sliding properties according to FIG. 1b has been created from the unfinished bearing of FIG. 1a.

Figure 2A:
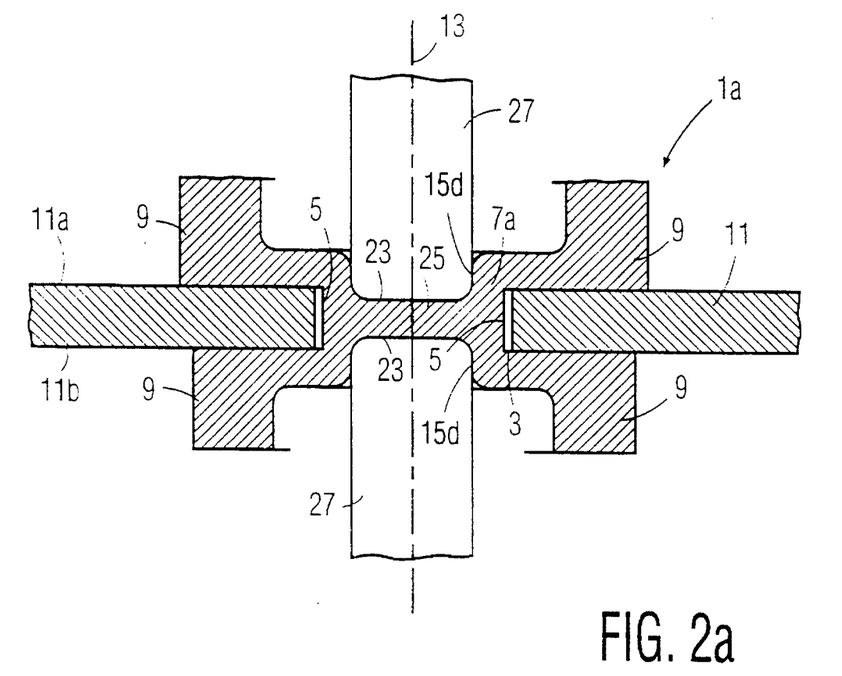
FIG. 2a showing the action of the mandrels and FIG. 2b showing the result of the mandrel action.
Figure 2B:
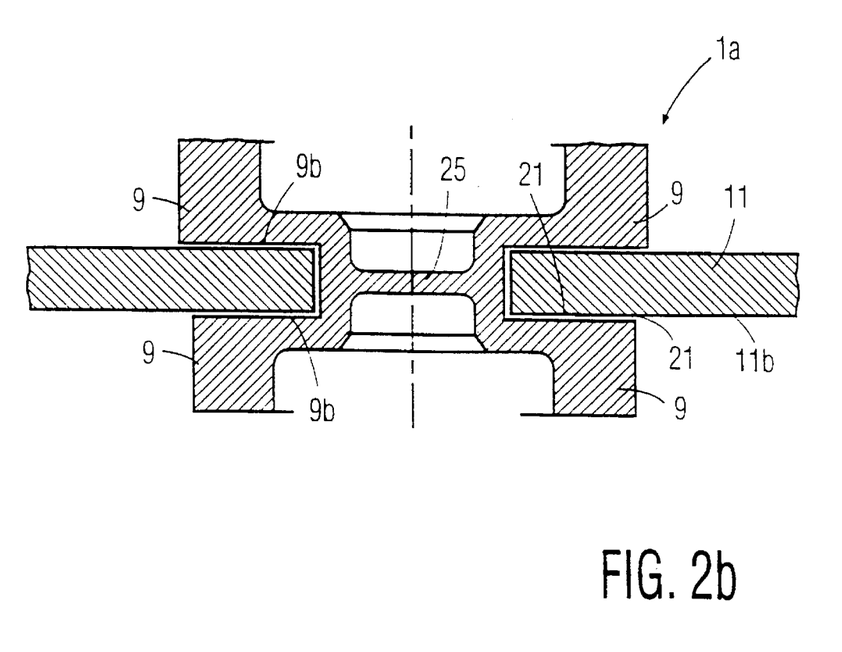

FIG. 2a shows a different embodiment of the bearing part 1a with a bridge 7a and retaining pieces 9. The bearing part 1a has again been injection-moulded over the hole 13 of the bearing plate 1 with hole edge 7. The bridge 7a is passed through the hole 3, and the retaining pieces 9 bear on the surfaces 11a and 11b of the bearing plate 11. Depressions 23 have been injection-moulded in the bridge 7a in the direction of the centreline or axis 13. Between the depressions 23, the bearing bridge is closed by means of a radial support disc 25. Mandrels 27 whose cross-section corresponds to the cross-section of the depressions 23 are provided for deforming the bridge 7a and thus to displace the synthetic resin material towards the hole walls. The mandrels 27 are moved towards one another, so that the synthetic resin material flows away towards the hole edges 5 and farther, perpendicular thereto, in the direction of the centreline or axis 13, while the thickness of the radial support disc 25 decreases. After the deformation process, the unfinished bearing of FIG. 2a formed by injection-moulding has been converted into an operational plain bearing according to FIG. 2b, the support disc 25 having become thinner and the surfaces 9b of the retaining pieces 9 being removed from the surfaces 11a and 11b of the bearing plate 11, whereby a gap 21 is formed.

Figure 3A:
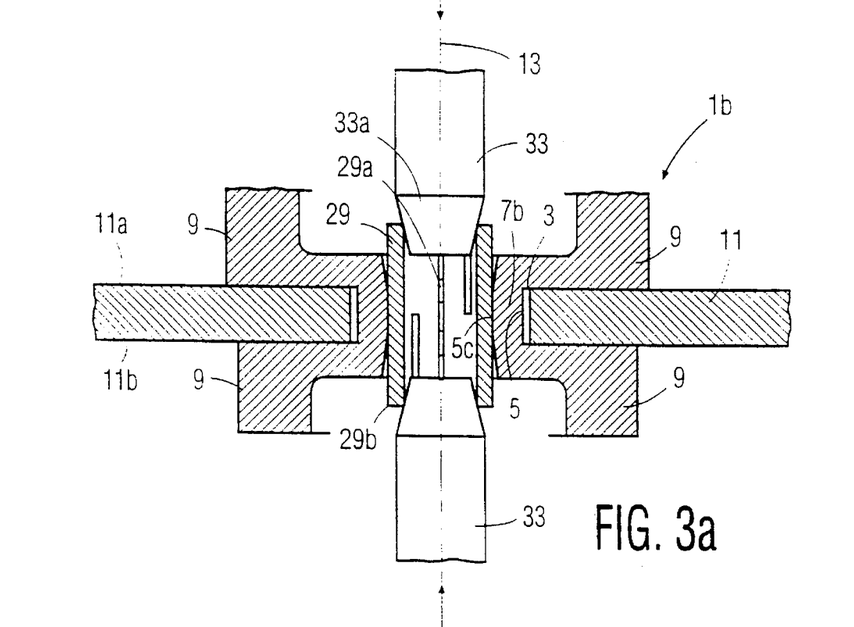
Figure 3A:
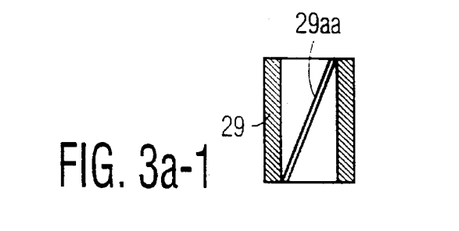
Figure 3B:
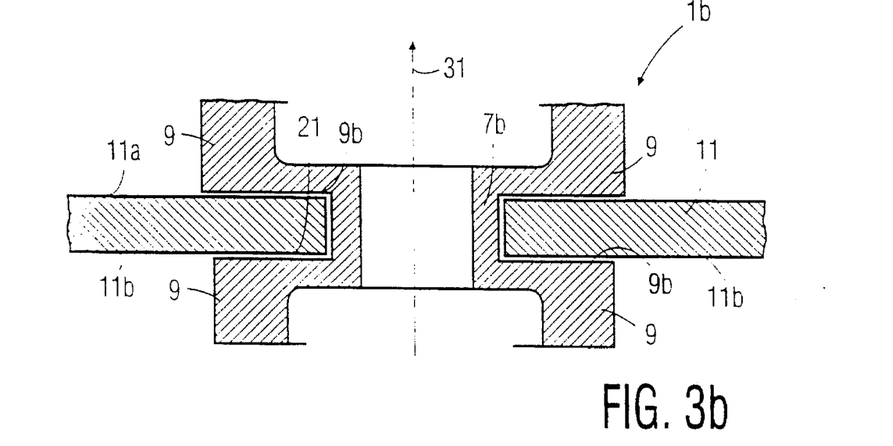

It is important that the displacement direction of the synthetic resin is towards the hole edges 5. To improve this displacement towards the hole edges 5, a third embodiment of the device for carrying out the method is shown in FIG. 3a where a bush 29 with multiple slots is inserted into a tapering opening 7b with a bulging wall 15c having its smallest opening diameter in the center of the opening, the slot 29a extending preferably perpendicular to the bearing plate, so in the longitudinal bush direction. Alternatively, however, the slot may be provided diagonally as is shown in FIG. 3a-1 with slot 29aa. The mandrels 33 moved from both plate surfaces 11a, 11b in the direction of the arrows 31 against the bush ends 29b press with tapering tips 33a against the axial bush ends 29b, thus widening the bridge 7b in the direction of the hole edges 5. In this case the synthetic resin material also flows towards the hole edges 5 and simultaneously parallel to the centerline or axis 13 in both directions towards the plate surfaces 11a and 11b. As FIG. 3b shows, the result corresponds to that of the deformation operation of FIG. 1, where the surfaces 9b of the retaining pieces 9 have been lifted from the plate surfaces 11a and 11b by a lengthening of the bearing bridge 7b, thus forming the gap 21. The unfinished bearing of FIG. 3a formed by injection-moulding has been transformed into a plain bearing according to FIG. 3b by the deformation operation with the mandrels 33 and the bush 29 of FIG. 3a.

Figure 4A:
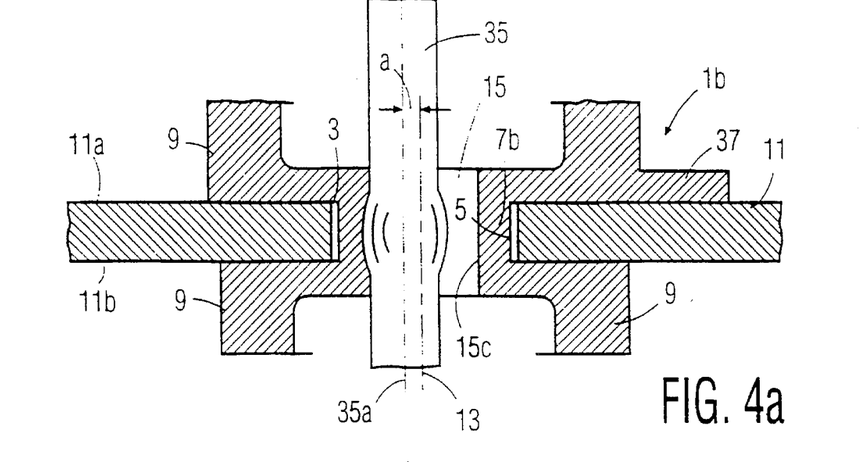

FIG. 4a shows a fourth embodiment of a device for deforming the bearing bridge 7b. The initially stiffly movable injection-moulded unfinished bearing again comprises the plate 11 with the hole 3 around which the bearing part 1b with its bearing bridge 7b and its retaining pieces 9 has been moulded. To convert this unfinished bearing into a plain bearing, a mandrel 35 is inserted into the opening 15 having an opening wall 15c, the axis 35a of the mandrel being shifted relative to the axis 13 of the opening 15 by a difference A. The mandrel 35 has a bulging shape in the region of the bearing bridge 7b with the greatest bulge diameter approximately in the center of the bearing plate. As a result, the mandrel 35, when rotated in the direction of an arrow 35b about the axis 13, moves eccentrically and widens out the wall portion 15c of the opening 15 preferably at half the length of the opening in the bearing plate center by means of this free-forming process. The synthetic resin material is displaced towards the hole edges 5 during this. At the same time, as in the preceding embodiments, it also flows in an axial direction towards the plate surfaces 11a and 11b.

Figure 4B:
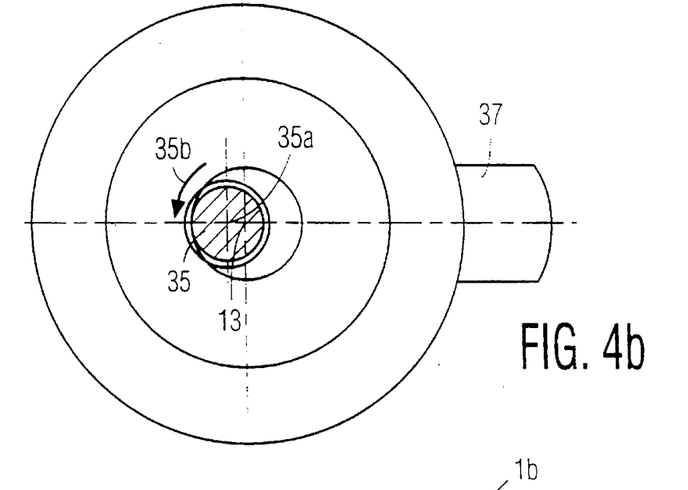
Figure 4C:
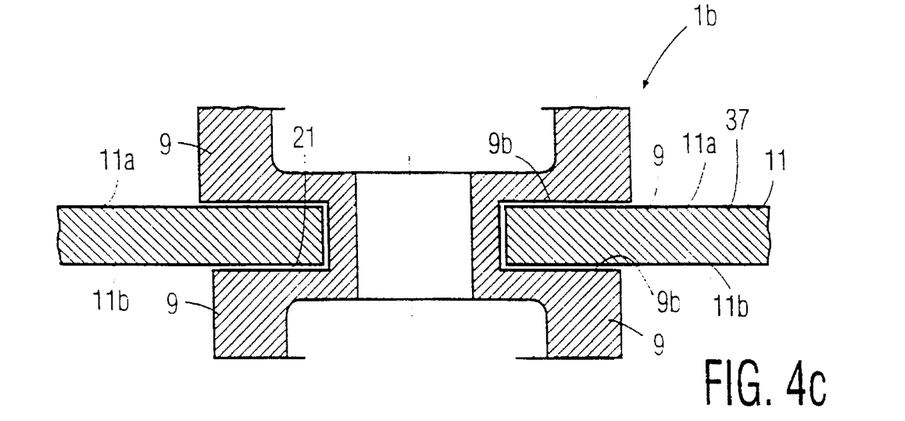
FIG. 4c shows the plain bearing formed during the widening process.

FIG. 4b shows the rotational movement of the mandrel 35. FIG. 4c shows the plain bearing created from the stiff unfinished bearing 4a through the eccentric rotation of the mandrel 35, whereby the surfaces 9b of the retaining pieces 9 have lifted themselves off the surfaces 11a and 11b of the bearing plate, thus creating gaps 21.

To avoid rotation of the bearing part 1b during the rotation of the mandrel 35, the bearing part 1b is provided with a projection 37 with which the bearing part 1b can be locked against rotation.

Figure 5A:
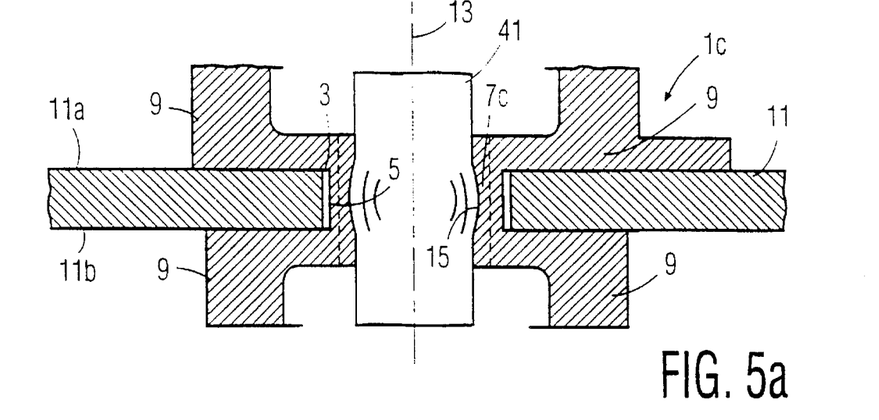
Figure 5B:
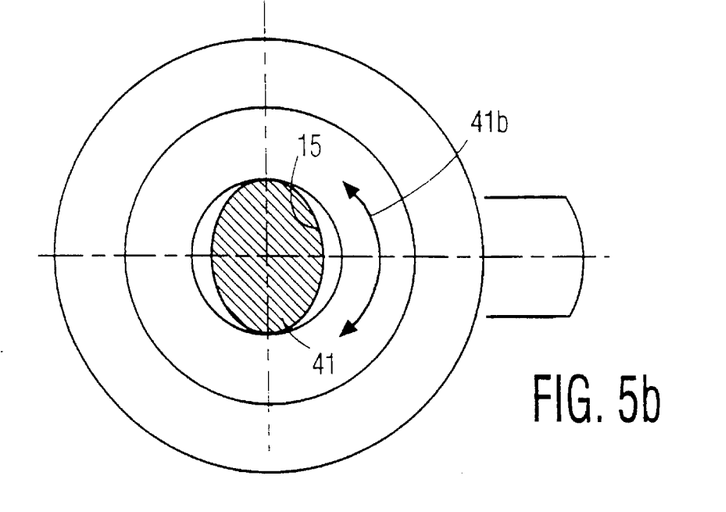

FIG. 5a shows a fifth embodiment of a device for carrying out the deformation operation on the bridge 7c of a bearing part 1c which consists of the bearing bridge 7c and the retaining pieces 9. The opening 15 in this case has an elliptical cross-section. A mandrel 41 of corresponding elliptical shape can be inserted into this opening 15 of elliptical cross-section. The mandrel 41 has a bulging shape in the region of the bearing bridge 7c with the greatest bulge diameter approximately in the centre of the bearing plate. FIG. 5a shows the arrangement in side elevation, and FIG. 5b in cross-section. The cross-section of the mandrel 41 provided in the opening 15, also of elliptical shape, is clearly discernible. The opening 15 may be widened through rotation of the mandrel 41 in the direction of the double arrow 41b, and the shape shown in broken lines in FIG. 5b is obtained.

Figure 5C:
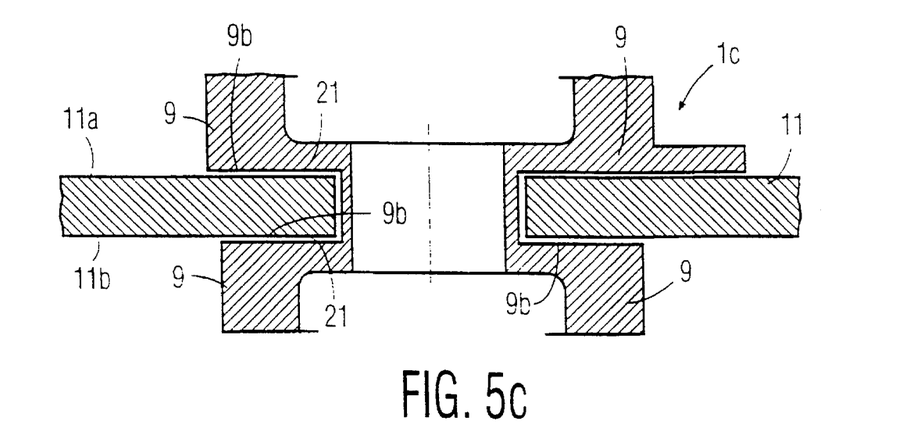
FIG. 5c shows the moulded part of FIG. 5a transformed into a plain bearing.

During this widening process, the synthetic resin material is pressed towards the hole edges 5, as in all other devices, flowing in the direction of these hole edges and also carrying out a flow movement parallel to the axis 13 towards the plate surfaces 11a and 11b. The plain bearing shown in FIG. 5c is thereby created from the hardly or stiffly movable unfinished bearing of FIG. 5a and 5b, after the surfaces 9b of the retaining pieces have lifted themselves off the bearing plate surfaces 11a and 11b, thus forming gaps 21.

Figure 6A:
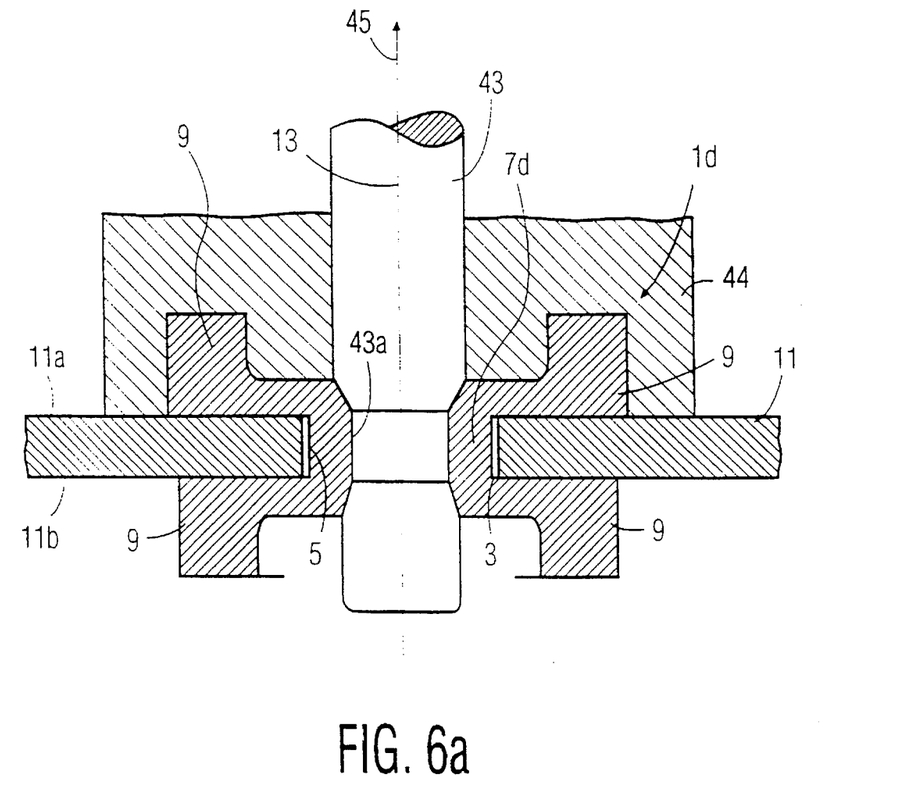
FIGS. 6a and 6b show the conversion of the bearing part into a functional plain bearing, whereby the mandrel carrying out the displacement of synthetic resin is introduced simultaneously with the injection-moulding process of the moulded bearing part, after which it is pulled out so as to displace the synthetic resin, the moulded bearing of FIG. 6a being converted thereby into a plain bearing according to FIG. 6b.

FIG. 6a shows a sixth embodiment of the device for deformation of the bearing part 1d which has been injection-moulded over the hole 3 of the bearing plate 11. The bearing part 1d comprises a bearing bridge 7d extending through the hole 3 and retaining pieces 9 which grip around the plate surfaces 11a and 11b. A mandrel 43 of the mould was enclosed in the bridge 7d during injection-moulding, the axis of the mandrel 13 coinciding with the axis of the bridge 7d. The mandrel 43 has a constricted portion 43a in the region of the bridge 7d. This constricted portion 43a is a little longer than the bridge 7d in axial direction in the region of the bearing plate 11.

Figure 6B:
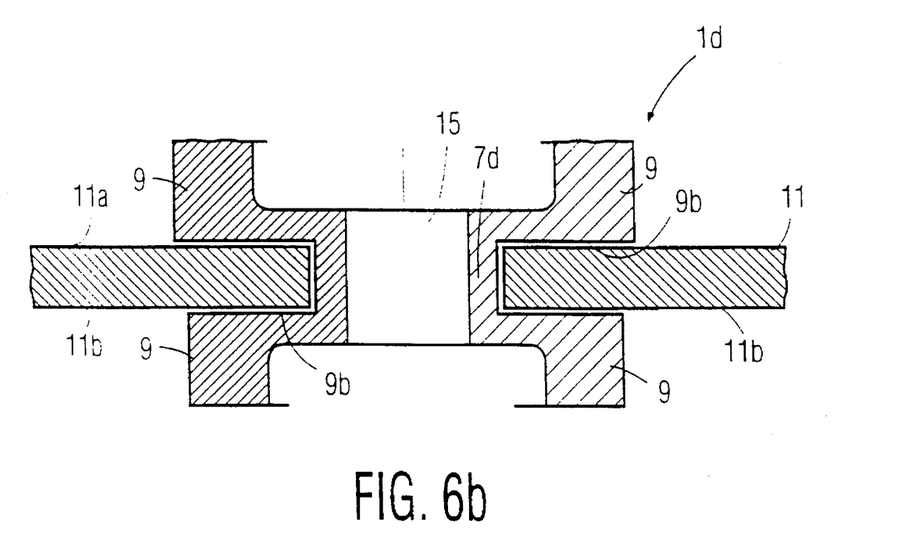

As is shown in FIG. 6a, the bearing part 1d is deformed in that the mandrel 43, which forms part of the mould, is pulled out. During pulling out of the mandrel, before separation of the mould, which may take place in conjunction with other slides, pins, or retention devices of the mould, the mould acts as a hold-down 44 which supports the bearing plate at the side of its surface 11a. When the mandrel 43 is pulled from the bearing bridge 7d in the direction of an arrow 45 for the purpose of carrying out the deformation process, the bearing bridge 7d is widened in the direction of the hole walls 5a. Owing to the flow of material towards the hole edges 5 and towards the bearing plate surfaces, the bridge increases its dimension in the direction of the axis 13, and the retaining piece surfaces 9b are lifted off the plate surfaces 11a and 11b. The stiffly movable unfinished bearing of FIG. 6a has then become a plain bearing according to FIG. 6b.

Figure 7A:
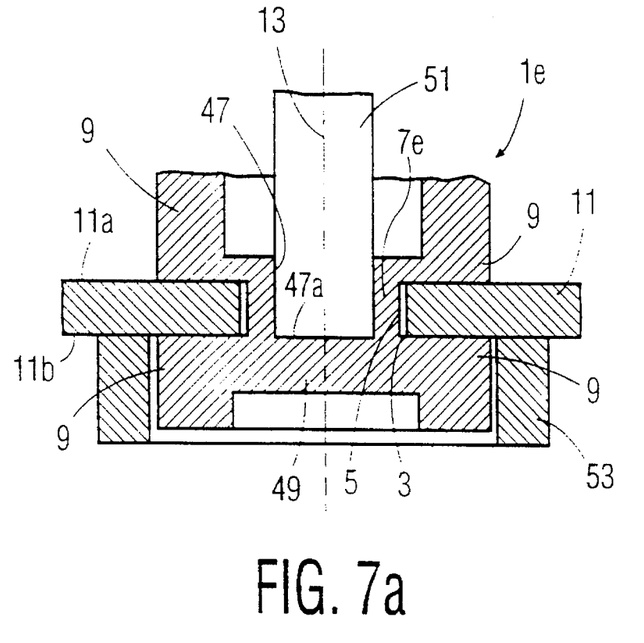
FIGS. 7a and 7b show a moulded plain bearing similar to the one shown in FIG. 2a and 2b with a radial support disc which is maintained; a mandrel is introduced into a central cavity of the bridge which does not extend throughout this bridge, and presses against the radial support disc owing to which the bridge becomes longer; the unfinished plain bearing of FIG. 7a is thus transformed into a plain bearing according to FIG. 7b.

A seventh embodiment of the device for carrying out the deformation process of the bearing part is shown in FIG. 7a. The bearing part 1e is injection-moulded around the hole 3 of the bearing plate 11 and consists of the bearing bridge 7e extending through the hole and the retaining pieces 9 gripping around the plate surfaces 11a and 11b. A depression 47, whose bottom 47a is provided approximately at the level of the lower plate surface 11b, extends in a direction parallel to the axis or centerline 13 in the drawing from the upper side of the bearing part 1e. A connection 49 acting as a radial support disc interconnects the retaining pieces at the lower side of the bearing part 1e of FIG. 7a and is also in connection with the bearing bridge 7e.

A mandrel 51 is provided, which can be inserted into the depression 47. A countersupport 53 supports the lower plate surface 11b.

Figure 7B:
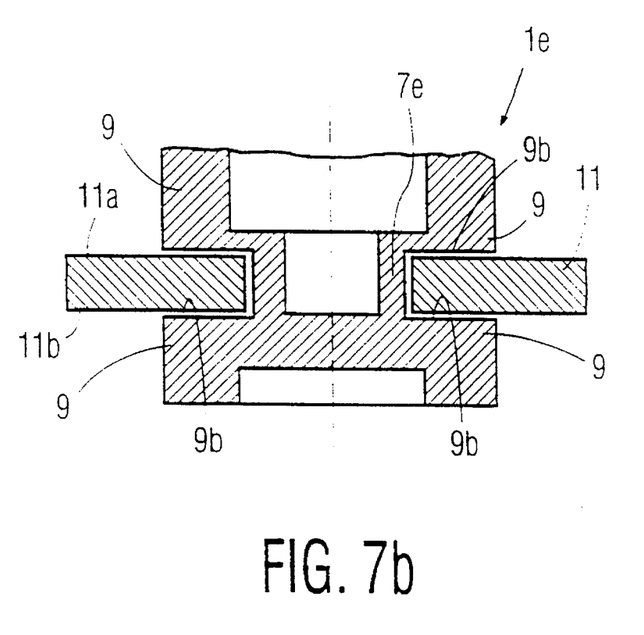

When the mandrel 51 is pressed against the connection 49 for carrying out the deformation process, the surfaces 9b are lifted off the plate surfaces 11a and 11b while the bearing bridge 7e is lengthened. The hardly or stiffly movable unfinished bearing of FIG. 7a is converted thereby into a plain bearing according to FIG. 7b.

Figure 8A:
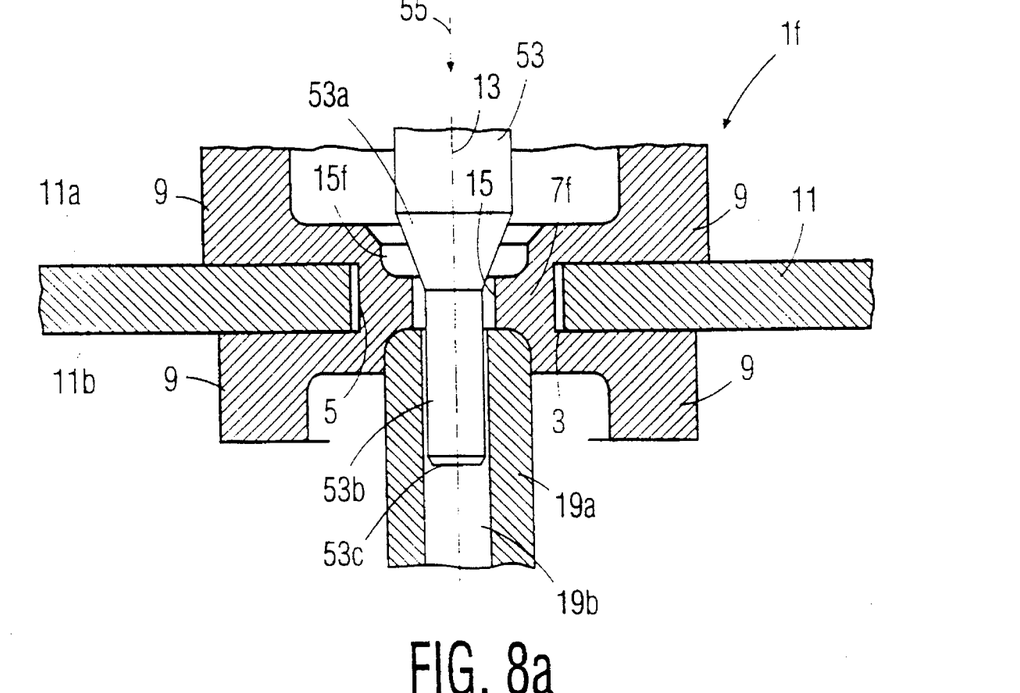
FIG. 8a shows the arrangement and FIG. 8b shows the unfinished part converted into a plain bearing.

An eighth embodiment of the device for carrying out the deformation process is described with reference to FIG. 8a. The bearing part 1f here is injection-moulded around the hole 3 of the bearing plate 11. The bearing part 1f comprises a bearing bridge 7f which extends through the hole 3 and the retaining pieces 9 which rest against the surfaces 11a and 11b of the plate 11. An opening 15, which is widened at the upper and lower end in the shape of a cup 15f, extends centrally through the bearing bridge 7f. In order to be deformed, the bearing part 1f is supported from below by a countersupport 19a which engages into the lower cup 15f. A mandrel 53 enters the upper cup 15f from the upper side of the bearing part 1f. Seen in the direction of its free end 53c, this mandrel first has a portion of greater diameter which corresponds approximately to the diameter of the cup 15f, then a tapering portion 53a in the form of a truncated cone, and finally a mandrel portion 53b of smaller diameter. This mandrel portion 53b of smaller diameter enters a recess 19b of the countersupport 19a. Mandrel 53 and countersupport 19a are thus mutually aligned.

Figure 8B:
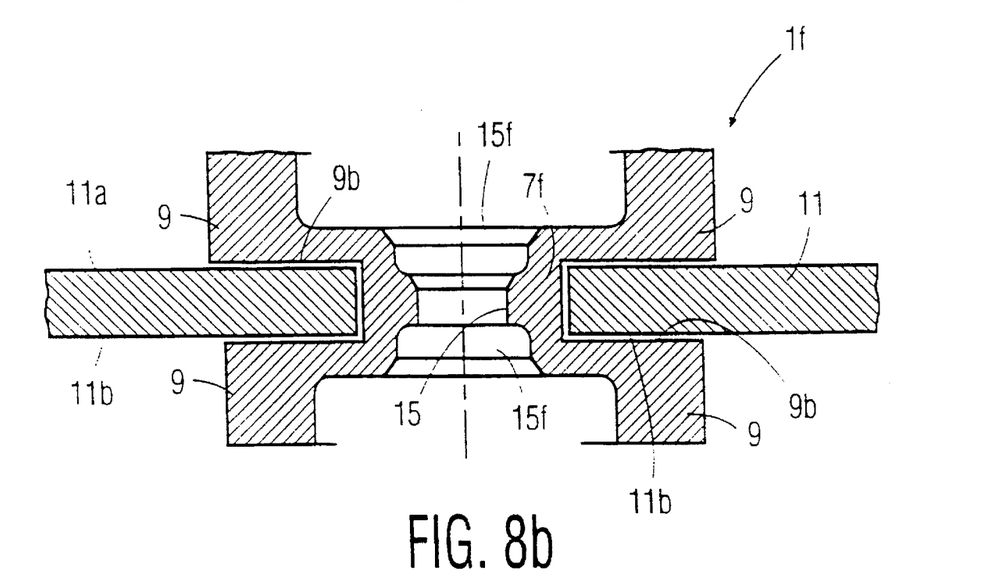

When the mandrel 53 moves into the bearing bridge 7f in the direction of the arrow 55, the synthetic resin material of the bearing bridge 7f will flow radially towards the hole edges 5 and axially further towards the two bearing plate surfaces 11a and 11b. The bearing bridge 7f thus lengthens itself in the direction of the axis 13, and the surfaces 9b of the retaining pieces lift themselves off the bearing plate surfaces 11a and 11b. The plain bearing of FIG. 8b is thus obtained from the stiffly movable unfinished bearing of FIG. 8a.

After the deformation and partly also during the deformation, a thermofixation process is carried out, i.e. a storing treatment while the parts are held in fixed position. Stoving treatment alone would lead to subsequent shrinking. By stoving treatment is meant in this case storage at a temperature substantially higher than room temperature and without fixation. Depending on the nature of the polymer, the stoving treatment usually takes place above 100° C. During fixation, the deformation pressure is maintained during cooling-down. Owing to the deformation and the additional stoving treatment and fixation, the bearing properties become more load-resistant and the bearing becomes more heat-resistant up to the temperature of the fixation process.

We claim:

1. A method of manufacturing a functional part of synthetic material in a bearing plate so as to have bearing properties, said method comprising the steps of:

a) providing a bearing plate with opposing plate surfaces and a hole wall defining a hole extending through said plate between said plate surfaces;

b) molding a functional part of synthetic resin material on said bearing plate with said functional part including retaining portions each which bear on a respective said plate surface adjacent said hole and a bridge portion extending through said hole between said retaining portions transverse to said bearing plate, said bridge portion including a bore wall defining a bore extending into said bridge portion; and c) displacing the bore wall in said bridge portion so that (i) said synthetic resin material flows towards said hole wall of said bearing plate and in a direction transverse to said bearing plate to displace said retaining portions away from each other, whereby clearance is created between the retaining portions and their respective plate surfaces.

2. A method as claimed in claim 1, wherein said step of displacing comprises introducing a mandrel into the bore in the bridge portion from a bearing plate surface.

3. A method as claimed in claim 2, wherein said step of displacing displaces said synthetic material in said bridge portion with a flow rate which lies below 0.1 m/sec.

4. A method as claimed in claim 3, wherein the synthetic material has an operating temperature and one of (i) a softening temperature and (ii) a melting range, and the temperature of the synthetic resin material of the bridge portion is set above the operating temperature thereof and below the respective one of (i) the melting range and (ii) the softening temperature of the synthetic resin material during said displacing step.

5. A method as claimed in claim 4, wherein said step of displacing creates a characteristic molecular orientation of the synthetic resin material of the bridge portion, and said method further comprises the step of stabilizing said characteristic orientation by one of (i) a fixation by lowering the temperature of the bridge portion while maintaining a deformation pressure and (ii) by tempering through storage at a temperature without load to temper said bridge portion.

6. A method as claimed in claim 4, wherein said bore extends through said bridge portion, and said step of displacing said bore wall comprises passing a lightly tapering mandrel through said bore in the bridge portion for displacing the synthetic resin material present between the mandrel and the hole wall of said bearing plate.

7. A method as claimed in claim 6, wherein the mandrel has a centerline and the taper of the mandrel is 3° to 7° relative to the mandrel centerline.

8. A method as claimed in claim 4, wherein said displacing step comprises (i) providing (a) a slotted bush within said bore in said bridge portion and (b) opposing mandrels with mandrel tips, and (ii) pressing the mandrels with tapering mandrel tips against the bush to widen said bush to displace the bridge portion outwardly towards said hole wall in said bearing plate, thereby lengthening the bridge portion.

9. A method as claimed in claim 4, wherein the wall of said bore in said bridge portion has a bulging shape towards the center of said bridge portion so the bridge portion has a smaller diameter at its center than at said retaining portions.

10. A method as claimed in claim 4, wherein said molding step comprises forming said bore wall in the bridge portion so that the bore extends only from one of the plate surfaces into the bridge portion to form a support disc portion occupying the complete cross-sectional area of the bridge portion in the region of the other plate surface, and said step of displacing comprises biasing the mandrel against the support disc portion for stretching the bridge portion in its longitudinal direction.

11. A method as claimed in claim 10, wherein the bore includes a bottom approximately at the level of the second plate surface, and during said step of displacing the mandrel is inserted to said bore bottom.

12. A method as claimed in claim 4, wherein said step of displacing includes the steps of (i) providing a mandrel having, in the direction towards its free end, a transition from a portion of greater diameter than the bore in the bridge portion via a constricted portion into a portion of smaller diameter than the bore in the bridge portion, (ii) providing a hold-down which supports the bearing portion against an application direction of the mandrel, the hold down having a recess for receiving the mandrel, and (iii) introducing the mandrel through the recess of the hold-down in said application direction to engage said bore wall of said bridge portion.

13. A method as claimed in claim 12, wherein said displacing step comprises aligning the inner diameter of the hold down and the outer diameter of the mandrel portion of smaller diameter so that the mandrel portion is guided within said recess in the hold-down during the step of introducing the mandrel into the hold down.

14. A method as claimed in claim 1, wherein said step of displacing displaces said synthetic material of said bridge portion with a flow rate below 0.1 m/sec.

15. A method as claimed in claim 14, wherein the synthetic material has an operating temperature and one of (i) a softening temperature and (ii) a melting range, and the temperature of the synthetic resin material of the bridge portion is set above the operating temperature thereof and below the respective one of (i) the melting range and (ii) the softening temperature of the synthetic resin material during said displacing step.

16. A method as claimed in claim 15, wherein said step of displacing of said bridge portion comprises at least one of (i) vibrating and (ii) rotating the mandrel in said bore in said portion bridge portion, and said stabilizing step comprises heat treating the air in the bore region during the rotation or vibration movement of the mandrel.

17. A method as claimed in claim 15, wherein said displacing step comprises eccentrically displacing an eccentrically arranged mandrel against said bore wall.

18. A method as claimed in claim 15, wherein said molding step includes forming the bore in said bridge portion with an elliptical cross-sectional profile, and said displacing step comprises one of (i) a rotating and (ii) a reciprocating movement of a mandrel having a correspondingly shaped elliptical profile.

19. A method as claimed in claim 18, wherein the mandrel has a bulging shape whose major diameter is situated approximately in one of (i) the center of said bearing portion and (ii) in the central region of the bearing plate.

20. A method as claimed in claim 15, wherein said molding step comprises the step of including an insert mandrel in the bridge portion, said insert mandrel having a constriction at least in the region of said hole in said bearing plate, and said step of displacing comprises pulling of the insert mandrel out of the bridge portion.

21. A method as claimed in claim 1, wherein said displacing step includes introducing mandrels into the bore in the bridge portion from both bearing plate surfaces.

22. A method as claimed in claim 1, wherein the synthetic material has an operating temperature and one of (i) a softening temperature and (ii) a melting range, and the temperature of the synthetic resin material is set above its operating temperature and below the respective one of i) the melting range and ii) the softening temperature of the synthetic resin material during the displacing step.

23. A method as claimed in claim 1, wherein said displacing step creates a characteristic molecular orientation of said synthetic resin material, and said method further comprises the step of stabilizing said molecular orientation by one of (i) a fixation by cooling while maintaining a deformation pressure, and (ii) by tempering with storage at a temperature without load.

24. A method as claimed in claim 1, wherein said displacing step comprises at least one of (i) vibrating and (ii) rotating a mandrel in the bore of said bridge portion.

25. A method as claimed in claim 1, wherein said bore extends through said bridge portion, and said step of displacing said bore wall comprises passing a lightly tapering mandrel through said bore in the bridge portion.

26. A method as claimed in claim 1, wherein said displacing step comprises moving mandrels towards each other from both plate surfaces against said bore in the bridge portion.

27. A method as claimed in claim 1, wherein said displacing step comprises widening said bore in the bridge portion with an eccentrically arranged mandrel by an eccentric motion of the mandrel.

28. A method as claimed in claim 1, wherein said molding step includes forming said bore in said bridge portion with an elliptical cross-sectional profile, and said displacing step comprises one of (i) a rotating and (ii) a reciprocating movement of a mandrel having a correspondingly shaped elliptical profile.

29. A method as claimed in claim 1, wherein said molding step comprises molding an insert mandrel in the bore in said bridge portion, which mandrel has a constriction at least in the region of said hole in said bearing plate, and said displacing step comprises pulling the insert mandrel out of said bridge portion.

30. A method as claimed in claim 1, wherein said molding step comprises forming the bore in the bridge portion so that said bore extends only from one of the plate surfaces into the bridge portion to form a support disc portion occupying the complete cross-sectional area of the bridge portion in the region of the other plate surface, and said displacing step comprises biasing a mandrel against said support disc portion to stretch said bridge portion in a longitudinal direction transverse to said bearing plate.

31. A method as claimed in claim 1, wherein said displacing step includes the steps of (i) providing a mandrel having, in the direction towards its free end, a transition from a portion of greater diameter than the bore in the bridge portion into a portion of smaller diameter than the bore in the bridge portion, and (ii) providing a hold-down which supports the bridge portion against an application direction of the mandrel, said hold down having a recess for receiving the mandrel, and (iii) inserting the mandrel through said recess in the hold-down in said application direction to engage said bore wall of said bridge portion for displacing the synthetic resin material in the direction of the hole wall of the bearing plate.

* * * * *